2,782,238

NORTRICYCLYL ETHERS

Henry Bluestone, Samuel B. Soloway, Julius Hyman, and Rex E. Lidov, Denver, Colo., assignors, by mesne assignments, to Shell Development Company, Emeryville, Calif., a corporation of Delaware No Drawing. Application July 20, 1951,
Serial No. 237,843

3 Claims. (Cl. 260—612)

This invention relates to certain novel chemical compounds, consisting of derivatives of nortricyclene or tricyclo-(2.2.1.0$^{2,6}$)-heptane, and more particularly to the ether and thio-ether derivatives of the same or nortricyclyl ethers and nortricyclyl thio-ethers.

The new chemical compounds of this invention include 3-methoxynortricyclene, 3-allyloxynortricyclene, 3-cyclohexyloxynortricyclene, 3-benzyloxynortricyclene, 3-phenoxynortricyclene, 3-tetrahydrofurfuryloxynortricyclene, and 3-nortricyclmercaptoacetic acid. These compounds are useful as intermediates in the preparation of other compounds, such as pharmaceuticals, insecticides, and the like, and in the formation of resins and polymers.

The compound 3-methoxynortricyclene, or methylnortricyclyl ether may be prepared by the reaction between bicyclo (2.2.1) heptadiene and methanol as follows:

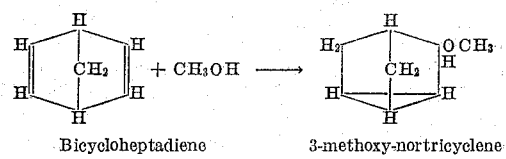

Bicycloheptadiene            3-methoxy-nortricyclene

It will be noted that, in the above reaction, a rearrangement of the ring structure takes place. This ring structure, i. e. that of nortricyclene, can be identified by infrared spectroscopic analysis. It will also be noted that the expected addition to one or both double bonds of a diolefin does not take place in the usual manner, in that addition to each end of a double bond does not occur, but rather addition is accompanied by rearrangement, a totally unexpected occurrence.

By a similar reaction, the following compounds have been prepared by the reaction between bicycloheptadiene and the indicated reactants.

Bicycloheptadiene+:
  Allyl alcohol→3-allyloxynortricyclene
  Cyclohexanol→3-cyclohexyloxynortricyclene
  Benzyl alcohol→3-benzyloxynortricyclene
  Phenol→3-phenoxynortricyclene
  Tetrahydrofurfuryl alcohol→
                        3-tetrahydrofurfurylnortricyclene As will be shown in the examples given later, certain of those reactions may be catalyzed by sulfuric acid, by p-toluenesulfonic acid, or by boron trifluoride.

The compound 3-nortricyclyl mercantoacetic acid can be made by the reaction between bicycloheptadiene and mercaptoacetic acid, as follows:

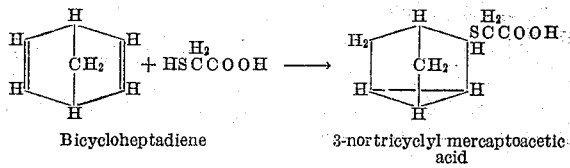

Bicycloheptadiene         3-nortricyclyl mercaptoacetic acid

In the following examples, suitable methods of making several compounds of this invention are shown, but it will be understood that other methods of making these compounds may exist.

EXAMPLE 1

(Preparation of 3-methoxy-nortricyclene)

A mixture of 920 g. of bicycloheptadiene, 768 g. of methanol and 60 g. of concentrated sulfuric acid was refluxed for a period of 47 hours. The product was worked up by ether extraction and was separated from higher-boiling, di-addition material by distillation; 407 g. of material boiling at 51–57° (18 mm.) was obtained; $N_D^{26}$ 1.4689; molecular weight, 130 (theory, 124).

Infrared spectroscopy indicated that the product contained the nortricyclenic compound; its presence to the extent of 74 percent was shown by catalytic hydrogenation.

A small portion (10 g.) of the product was redistilled; it was found to boil at 48° (19 mm.); $N_D^{26}$ 1.4627.

Analysis for $C_{12}H_8O$: Calculated—C, 77.4%, H, 9.68%. Found—C, 77.2%, H, 9.73%.

Infrared spectroscopy indicated that the redistilled product contained the nortricyclenic compound; its presence to the extent of 55 percent was shown by catalytic hydrogenation.

EXAMPLE 2

(Preparation of 3-allyloxynortricyclene)

A mixture of 92 g. of bicycloheptadiene, 232 g. of allyl alcohol, 2 ml. of concentrated sulfuric acid and 2 ml. of water was refluxed for a period of 4 hours; 2 ml. additional of concentrated sulfuric acid was added after the first two hours. The temperature of the reaction mixture remained at 84° C. throughout the period of reflux. The product was worked by ether extraction and was isolated by distillation. Redistillation of the crude product yielded 59 g. of material boiling at 75–80° (19 mm.)

Analysis for $C_{10}H_{14}O$: Calculated—C, 80.0%; H, 9.35%; molecular weight, 145. Found—C, 79.8; H, 9.24%.

Infrared spectroscopy indicated that the product contained the nortricyclyl compound; its presence to the extent of 80 percent was shown by catalytic hydrogenation.

EXAMPLE 3

(Preparation of 3-cyclohexyloxynortricyclene)

A mixture of 165 g. of cyclohexanol, 110 g. of bicycloheptadiene 2 ml. of concentrated sulfuric acid and 2 ml. of water contained in a 1 liter flask equipped with a reflux condenser was heated by an electric mantle. The temperature of the reaction mixture during the initial period of reflux was 95° and it gradually rose to 125° over a period of 2¼ hours. At this point the mixture was cooled and mixed with water and the product was isolated by ether extraction and distillation of the extract; 53.5 g. of material was obtained boiling at 60–64° (0.3 mm.); $N_D^{32}$ 1.4875.

Infrared spectroscopy indicated the presence of the nortricyclyl structure; and catalytic hydrogenation indicated the presence of the nortricyclyl ether to the extent of 65%.

Analysis for $C_{13}H_{20}O$: Calculated—C, 81.3%, H, 10.42%. Found—C, 81.0% H, 10.42%.

EXAMPLE 4

(Preparation of 3-benzyloxynortricyclene)

A mixture of 10.8 g. (1 mole) of benzyl alcohol, 92 g. (1 mole) of bicycloheptadiene, and 4 g. of p-toluenesulfonic acid was heated on the steam bath for a period of 18 hours; the internal temperature varied from 92–94°. The reaction mixture was then transferred to a separatory funnel and was washed successively with five 100 ml. portions of 5 percent sodium carbonate solutions and one 100 ml. portion of saturated sodium chloride solution. Distillation of the organic phase yielded 82 g. of material boiling at 85–87° (0.4 mm.); $N_D^{33}$ 1.5334.

Infrared spectroscopy indicated the presence of the nortricyclyl structure. Hydrogenation showed 56% of the above ether.

EXAMPLE 5

(Preparation of 3-benzyloxynortricyclene)

A product identical with that of Example 4 was obtained by heating a mixture of 46 g. of bicycloheptadiene, 45 g. of benzyl alcohol and two drops of boron trifluoride etherate on a steam bath for a period of six hours. The product was isolated in the same manner described above; 4.5 g. of material boiling at 74–84° (0.2 mm.) was obtained; $N_D^{24}$ 1.5378.

Analysis for $C_{14}H_{16}O$: Calculated—C, 84.0%; H, 8.02%. Found—C, 84.0%; H, 7.60%.

Infrared spectroscopy indicated that the product contained the nortricyclyl structure. Hydrogenation showed 52% of the above ether.

EXAMPLE 6

(Preparation of 3-phenoxynortricyclene)

A mixture of 94 g. (1 mole) of phenol, 300 g. of bicycloheptadiene and 2 g. of p-toluenesulfonic acid was heated on a steam bath under a reflux condenser for a period of three hours. The reaction mixture was then diluted with ether and was washed successively with dilute sodium hydroxide solution, water and saturated sodium chloride solution. The ethereal solution was dried over anhydrous sodium sulfate and then distilled; the product obtained boiled at 72–75° (0.3 mm.) and amounted to 71 g.; $N_D^{26}$ 1.5496.

Analysis for $C_{13}H_{14}O$: Calculated—C, 83.8%; H, 7.53%; molecular weight, 186. Found—C, 83.6%; H, 7.54%; molecular weight, 195.

Infrared spectroscopy indicated that the product contained the nortricyclyl compound; its presence to the extent of 71 percent was shown by catalytic hydrogenation.

EXAMPLE 7

(Preparation of 3-tetrahydrofurfuryloxynortricyclene)

A mixture of 306 g. of tetrahydrofurfuryl alcohol, 100 g. of bicycloheptadiene and 5 ml. of boron trifluoride etherate contained in a 1 liter flask fitted with a reflux condenser was heated by an electric mantle. After the temperature of the mixture had risen to 130° heating was discontinued. When the temperature rose spontaneously to 150°, cooling was applied to stop the reaction (total reaction time, 3 hours). The reaction mixture was then diluted with ether and the ethereal solution was washed successively with sodium bicarbonate solution, water and saturate sodium chloride solution. Evaporation of the ether and distillation of the residue separated the crude product from a higher-boiling, di-addition product. Redistillation of the crude material gave the pure compound amounting to 29.6 g., B. P. 70–82° (0.3 mm.); $N_D^{30}$ 1.4829.

Analysis for $C_{12}H_{18}O_2$: Calculated—C, 74.2%; H, 9.28%; molecular weight, 194. Found—C, 74.2%; H, 8.93%; molecular weight, 201.

Infrared spectroscopy indicated that the product contained the nortricyclyl compound; its presence to the extent of 50 percent was shown by catalytic hydrogenation.

EXAMPLE 8

(Preparation of nortricyclyl mercaptoacetic acid)

Mercaptoacetic acid (1 mole of 80 percent solution) was mixed with bicycloheptadiene (1.5 mole). Heat was evolved on admixture and the two phased system was heated on the steam bath for 18 hours. The product was distilled to yield, after removal of a forerun, a viscous oil having a boiling point of 145° C./.3 mm.; $N_D^{26}$ 1.5401.

Analysis for $C_9H_{12}O_2S$: Calculated—C, 58.7%; H, 6.5%; S, 17.4%; molecular weight, 184. Found—C, 59.6%; H, 6.7%; S, 16.8%; molecular weight, 200.

Infrared spectroscopic analysis indicated that the product thus obtained was almost wholly a nortricyclene derivative.

It will be understood, of course, that the amounts of reactants used and the time, temperature and other reaction conditions may be varied from those set forth in the above examples. In addition, the novel compounds of this invention may be made in other ways than those disclosed or indicated such as by utilization of nortricyclene or other derivatives thereof as starting materials, the same being now available, as disclosed and claimed in the copending United States applications of Milton Silverman, et al., Ser. No. 237,842, filed July 20, 1951, and now abandoned, entitled "Nortricyclene and Method of Producing the Same," and of Barney Saloway, et al., Ser. No. 237,845, filed July 20, 1951, and now abandoned, entitled "Monosubstituted Nortricyclene Derivatives."

It will be evident that the thio derivative of Example 8 is a thio ether, and that other mercaptans or mercapto derivatives may be similarly reacted with bicycloheptadiene to produce analagous thio-ethers. In addition, other alcohols than those given in the examples may be reacted to produce other ether derivatives of nortricyclene. Thus, the novel compounds of this invention include ether and thio-ether derivatives of nortricyclene, wherein the nortricyclyl radical is linked through either oxygen or sulfur to an organic radical or a derivative thereof, the organic radical being aliphatic, aromatic, alicyclic or heterocyclic.

A method of preparing the compounds of this invention is also disclosed and claimed in the copending United States application of Henry Bluestone, Samuel B. Soloway, Julius Hyman and Rex Lidov, Serial No. 237,844, filed July 20, 1951, entitled "Method for Producing Polycyclic Hydrocarbons and Derivatives Thereof," now U. S. Patent 2,730,548, issued Jan. 10, 1956, the disclosure thereof which is pertinent herein being hereby incorporated by reference.

What is claimed is:

1. A nortricyclyl ether having the following planar structural formula:

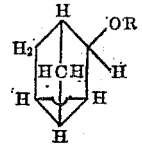

wherein R is an aromatic radical.

2. A nortricyclyl ether as defined in claim 1, wherein R is an aromatic hydrocarbon radical.

3. 3-phenoxynortricyclene.

References Cited in the file of this patent

UNITED STATES PATENTS

| | | |
|---|---|---|
| 2,388,765 | Rummelsburg | Nov. 13, 1945 |
| 2,488,489 | Borglin et al. | Nov. 15, 1949 |

OTHER REFERENCES

Chem. Abstr. 35 2489⁵.

Chem. Abstr. 44 Subject Index (A–N) page 12635 (col. 3, the penultimate compound listed in the bold face print).

Ring Index, p. 174, compound No. 1207, Reinhold Pub. Co. N. Y. (1940).

Roberts et al.: Jour. Amer. Chem. Soc., vol. 72 (1950), p. 3123 (entire article pp. 3116–24).